No. 858,574. PATENTED JULY 2, 1907.
W. B. CHURCHER.
ALTERNATING CURRENT RECTIFIER.
APPLICATION FILED AUG. 4, 1905.

Witnesses
A. McCormack
E. Trainer

Inventor
William B. Churcher
By C. W. Miles
Attorney

UNITED STATES PATENT OFFICE.

WILLIAM B. CHURCHER, OF CINCINNATI, OHIO, ASSIGNOR TO KENNON DUNHAM, OF CINCINNATI, OHIO.

ALTERNATING-CURRENT RECTIFIER.

No. 858,574.     Specification of Letters Patent.     Patented July 2, 1907.

Application filed August 4, 1905. Serial No. 272,650.

*To all whom it may concern:*

Be it known that I, WILLIAM B. CHURCHER, a citizen of the United States, residing at Cincinnati, in the county of Hamilton and State of Ohio, have invented certain new and useful Improvements in Alternating-Current Rectifiers, of which the following is a specification.

My invention relates to improvements in alternating current rectifiers.

One of its objects is to provide mechanism for producing direct current of low voltage from a source of alternating current.

Another object is to provide mechanism for producing low voltage direct currents of a character suitable for use in driving dental motors and for similar purposes from a source of alternating current.

Another object is to provide improved means for producing a uniform direct current from a source of alternating current.

Figure 1:
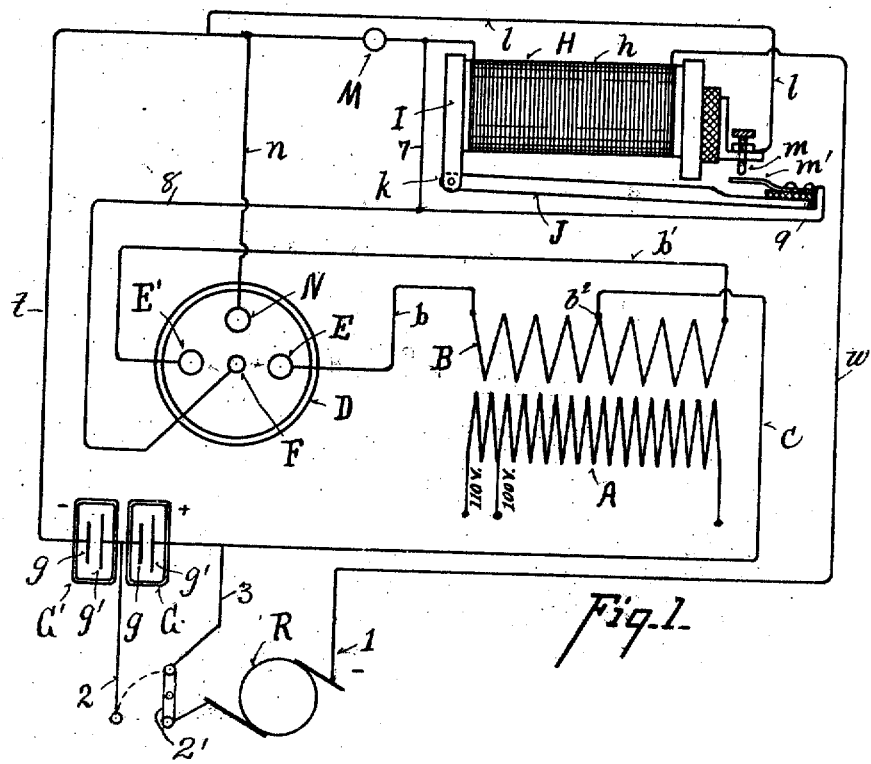
Figure 2:
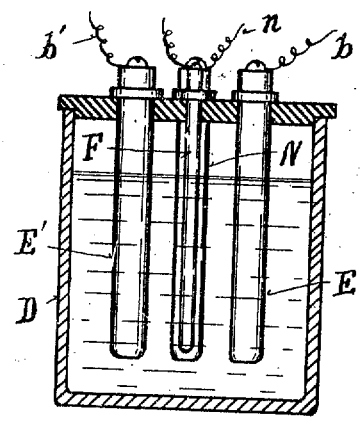
Figure 3:
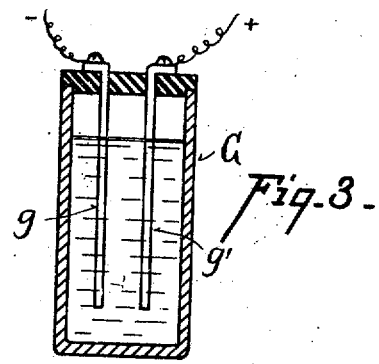

It further consists in certain details of form, combination and arrangement, all of which will be more fully set forth in the description of the accompanying drawings, in which;

Figure 1 is a diagram of my improved apparatus. Fig. 2 is a central vertical section through the rectifying cell. Fig. 3 is a central vertical section through one of the polarization cells.

In the accompanying drawings A represents the primary coil of a transformer, the terminals of which are connected to the service line wires or other source of alternating current.

B represents the secondary coil in which a current, usually of lower voltage than that of the line wire is generated by induction. This secondary has two terminal connections $b\ b'$ and an intermediate connection $b^2$. D represents a rectifying cell in which are a series of electrodes E E' composed of aluminium, and one or more electrodes $f$ of platinum, carbon or similar material. The electrolyte may be potassium or sodium phosphate or other substance suitable for the purpose. The lines $b\ b'$ are connected each to one or more electrodes E E' while the intermediate connection $c$ leads to one or more polarization cells G, two being shown in Fig. 1. These cells preferably contain lead electrodes $g\ g'$ immersed in dilute sulfuric acid so as to form under the action of the current accumulators or storage battery cells of small capacity.

H represents a relay consisting of a coil $h$ surrounding an iron core I.

J represents an armature pivoted at $k$ and adapted when attracted by the opposite end of the core I to close a circuit $l$ through the contact points $m\ m'$.

M represents a pilot light which serves to indicate the course taken by the current.

The motor R or other consumer of the rectified current is connected in circuit at terminals 1, 2, 3, a switch 2' serving to make connection selectively through line 2 or 3, the voltage being less between terminals 1 and 2 than between 1 and 3, say three volts between 1 and 2 and five bolts between 1 and 3, whereby the voltage may be suited to the motor or other use, or the speed of the motor may be regulated.

The dotted line 2' indicates that the current may be selectively established through motor R from either line 2 or 3 to line 1.

In order that excessive sparking at the contacts $m\ m'$ and injury thereto or liability of the same to stick together or fail to break the contact, I provide a separate electrode N of aluminium in the rectifying cell, connected in circuit by line $n$. Thus when contact at $m$ is broken, the current has an alternative path through line $n$, and the current is interrupted by the resistance of the electrolyte of the rectifying cell at the surface of electrode N instead of at contact $m$, at which point there is no sparking, the contacts $m\ m'$ are not burned or otherwise injured. The unidirectional but fluctuating current produced by the rectifying cell charges the polarization cells G to such an extent as to cause a steady direct current to be delivered to the motor R, which would not run efficiently on the pulsating current supplied by the rectifying cell.

The operation is as follows; the alternating current of the primary induces an alternating current in the secondary which current is changed to a unidirectional current by the electrodes E E', which in connection with the electrolyte permit the passage of current of one polarity and suppress current of the opposite polarity. When the switch 2' is open and R cut out of circuit the current passes from $b^2$ by line $c$ through cells G G' thence by line $t$ to pilot light $M_t$ which serves to indicate the path of the current and also as a resistance to reduce the quantity of current passing. Thence the current passes by lines 7 and 8 to electrode F and by electrodes E E' and lines $d\ d'$ to the terminals of coil B. When switch 2' is closed current passes as above described and also through R, line $w$ coil $h$ and lines 7 and 8. The action of coil $h$ however immediately closes contact $m$ whereupon pilot and resistance M is cut out of circuit and an increased current passes through cells G G' to enable them to compensate for irregularities in the rectified current, thereby delivering a uniform steady current to the motor R. When the switch 2' is opened the current is broken at $m$, and any spark by reason of connection $n$ and electrode N occurs at the surface of electrode N where it can do no injury. Thus while motor R is cut out of circuit, a small current flows through cells G G' by way of lines $c\ t$ through resistance M lines 7 and 8 and electrodes F, E E', this current being just sufficient to keep cells G G' charged ready for use, and not sufficient to cause an undesirable generation of gas in said cells, and when motor R is in circuit the contacts m m' serve to automatically reduce the resistance and supply sufficient current to drive the motor.

I am thus enabled to produce a steady direct current suitable for operating dental or other motors, and for other purposes where a steady direct current is required, from a source of alternating current. And also to provide durable and reliable apparatus for that purpose.

The mechanism herein specified is capable of considerable modification without departing from the principle of my invention.

Having described my invention, what I claim is;

1. In combination with a secondary coil inductively energized, a rectifier having a plurality of asymmetric conductors connected to the terminals of said secondary, a neutral conductor in electrical connection with an intermediate connection on said secondary, a polarization cell in circuit between the neutral conductor and said intermediate connection, a relay in circuit with the consumer of the rectified current, and a separate asymmetric conductor in electrical contact with the neutral line to prevent sparking and injury to the relay.

2. In combination with a secondary coil inductively energized, a rectifier having a plurality of asymmetric conductors connected to the terminals of said secondary, a neutral conductor in electrical connection with an intermediate connection on said secondary, a plurality of polarization cells in circuit between the neutral conductor and said intermediate connection, and a relay in circuit with the consumer of the rectified current.

3. In a mechanism of the character indicated, a primary coil, a secondary coil energized thereby and provided with terminal connections and an intermediate connection, a rectifier having a plurality of asymmetric conductors connected to the terminals of said secondary, a neutral conductor in electrical connection with the intermediate connection of the secondary, a polarization cell and a relay connected in circuit substantially as specified.

4. In a mechanism of the character indicated, a primary coil, a secondary coil energized thereby and provided with terminal connections and an intermediate connection, a rectifier having a plurality of asymmetric conductors connected to the terminals of said secondary, a neutral conductor in electrical connection with the intermediate connection of the secondary, and a relay, a polarization cell, and an asymmetric conductor connected in parallel with the relay, said last named elements being connected in circuit substantially in the manner specified.

In testimony whereof I have affixed my signature in presence of two witnesses.

WILLIAM B. CHURCHER.

Witnesses:
TILLIE PASCHEN,
C. W. MILES.